(12) United States Patent
Fu et al.

(10) Patent No.: US 11,157,290 B2
(45) Date of Patent: Oct. 26, 2021

(54) METHOD AND CIRCUIT FOR WAKING UP I2C DEVICE

(71) Applicant: AUTOCHIPS WUHAN CO., LTD., Wuhan (CN)

(72) Inventors: Huilan Fu, Hefei (CN); Jie Zhang, Hefei (CN); Shujie Lu, Hefei (CN)

(73) Assignee: AUTOCHIPS WUHAN CO., LTD., Wuhan (CN)

(*) Notice: Subject to any disclaimer, the term of this patent is extended or adjusted under 35 U.S.C. 154(b) by 121 days.

(21) Appl. No.: 16/421,494

(22) Filed: May 24, 2019

(65) Prior Publication Data
US 2020/0065116 A1 Feb. 27, 2020

(30) Foreign Application Priority Data
Aug. 27, 2018 (CN) .......................... 201810981568.4

(51) Int. Cl.
*G06F 9/4401* (2018.01)
*G06F 1/3296* (2019.01)
*G06F 13/42* (2006.01)

(52) U.S. Cl.
CPC .......... *G06F 9/4418* (2013.01); *G06F 1/3296* (2013.01); *G06F 13/4282* (2013.01); *G06F 2213/0016* (2013.01)

(58) Field of Classification Search
CPC . H04W 84/18; H04W 52/0235; H04W 84/20; G06F 13/4068; G06F 13/37; G06F 13/362; G06F 13/4282; G06F 1/3253; G06F 2213/0016; G06F 2213/0052; H04L 12/40039; H04L 7/044

USPC ..... 710/110, 9; 713/300, 323, 320, 324, 340
See application file for complete search history.

(56) References Cited

U.S. PATENT DOCUMENTS

| | | | | | |
|---|---|---|---|---|---|
| 5,459,842 | A | * | 10/1995 | Begun ................. | G06F 13/1631 710/68 |
| 5,978,749 | A | * | 11/1999 | Likins, Jr. ............... | E02D 13/00 700/108 |
| 6,009,493 | A | * | 12/1999 | Fujiyama ................ | G06F 13/28 711/1 |

(Continued)

FOREIGN PATENT DOCUMENTS

| | | |
|---|---|---|
| CN | 101876847 A | 11/2010 |
| CN | 104469451 A | 3/2015 |
| CN | 105426338 A | 3/2016 |
| WO | WO2012171582 A1 | 12/2012 |

OTHER PUBLICATIONS

Chinese First office action from China patent office in a counterpart Chinese patent Application 201810981568.4, dated Mar. 9, 2020 (17 pages).

(Continued)

*Primary Examiner* — Faisal M Zaman

(57) ABSTRACT

A method and circuit for waking up an I2C device are disclosed. The method includes determining whether a start signal is received; determining whether a next signal immediately received after the start signal is an address signal when the start signal is received; matching the next signal immediately received after the start signal with an address of the I2C device when the next signal is the address signal; and generating a wake-up signal to wake up the I2C device when the next signal immediately received after the start signal is matched with the address of the I2C device.

13 Claims, 3 Drawing Sheets

(56) References Cited

U.S. PATENT DOCUMENTS

| | | | | |
|---|---|---|---|---|
| 6,563,888 B1* | 5/2003 | Toriyama | ................ | H04L 7/033 |
| | | | | 370/503 |
| 6,671,708 B1* | 12/2003 | Kuromaru | ........... | G06F 9/30036 |
| | | | | 708/490 |
| 8,981,600 B2* | 3/2015 | Tsai | ........................ | H02J 50/80 |
| | | | | 307/104 |
| 2004/0257883 A1* | 12/2004 | Byeon | .................... | G11C 16/22 |
| | | | | 365/195 |
| 2010/0185841 A1* | 7/2010 | Monreal | ................ | G06F 13/37 |
| | | | | 713/2 |
| 2010/0229011 A1* | 9/2010 | Pedersen | ............... | G06F 1/3237 |
| | | | | 713/322 |
| 2011/0099005 A1* | 4/2011 | Zhang | .................... | G10L 19/04 |
| | | | | 704/207 |
| 2013/0067129 A1* | 3/2013 | Kashima | ............. | G06F 13/4286 |
| | | | | 710/110 |
| 2013/0157575 A1* | 6/2013 | Rothschild | ............. | G08C 23/04 |
| | | | | 455/41.3 |
| 2015/0330841 A1* | 11/2015 | Kern | ...................... | G01K 7/425 |
| | | | | 700/275 |
| 2016/0224505 A1* | 8/2016 | Harfert | ............... | G06F 13/4282 |

OTHER PUBLICATIONS

China Second office action, China Application No. 201810981568.4, dated Aug. 4, 2021 (19 pages).

* cited by examiner

METHOD AND CIRCUIT FOR WAKING UP I2C DEVICE

CROSS-REFERENCE TO RELATED APPLICATIONS

This application claims a priority to Chinese Patent Application No. 201810981568.4, filed on Aug. 27, 2018, the contents of which are herein incorporated by reference in its entirety.

TECHNICAL FIELD

The present disclosure generally relates to the technical field of communication, and more particularly, to a method and a circuit for waking up an I2C device.

BACKGROUND

An I2C bus supports production processes of any Integrated Circuit (IC). Information is transmitted between devices connected to the bus through a serial data line (SDA) and a serial clock line (SCL). Each device has a unique address ID, and may serve as a transmitter or receiver. To save energy, an I2C device is generally set to be in a dormant state under certain conditions, and the I2C device is woken up for reuse when it is needed.

In the related art, a wake-up sequence of the I2C device includes a start signal and an address signal. There occurs a glitch when the wake-up sequence is transmitted, and then the I2C device cannot normally be woken up by the wake-up sequence. Waking up the I2C device can only be implemented by powering off or restarting the I2C device to recover normal operation of the IC. Thus, waking up the I2C device is low in efficiency, and it is impossible to ensure the I2C device to be timely woken up and normally used.

In a long-term R&D process, it is found that an existing process for waking up I2C devices is low in efficiency, and it is impossible to ensure the I2C devices to be timely woken up and normally used.

SUMMARY

According to one aspect of the present disclosure, a method for waking up an I2C device are disclosed. The method includes determining whether a start signal is received; determining whether a next signal immediately received after the start signal is an address signal when the start signal is received; matching the next signal immediately received after the start signal with an address of the I2C device when the next signal is the address signal; and generating a wake-up signal to wake up the I2C device when the next signal immediately received after the start signal is matched with the address of the I2C device.

According to another aspect of the present disclosure, a circuit for waking up an I2C device is disclosed. The circuit includes a start detection processing module connected to an I2C bus, configured to determine whether a start signal is received from the I2C bus; an address receiving and comparing module, configured to determine whether a next signal immediately received after the start signal is an address signal and match the next signal with an address of the I2C device when the next signal is the address signal; and a wake-up signal processing module connected to the address receiving and comparing module, configured to generate a wake-up signal to wake up the I2C device when the next signal is the matched address signal.

According to yet another aspect of the present disclosure, a master device connected to a slave device via an I2C bus is disclosed. The master device includes a microchip performing a method for waking up the slave device when program instructions are performed, wherein the method includes determining whether a start signal is received; determining whether a next signal immediately received after the start signal is an address signal when the start signal is received: matching the next signal immediately received after the start signal with an address of the slave device when the next signal is the address signal and generating a wake-up signal to wake up the slave device when the next signal immediately received after the start signal is matched with the address of the slave device.

BRIEF DESCRIPTION OF THE DRAWINGS

In order to make the technical solution described in the embodiments of the present disclosure more clearly, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

Technical solutions in the embodiments of the present disclosure will be described clearly and completely below with reference to the accompanying drawings in the embodiments of the present disclosure. Apparently, the described embodiments are some but not all embodiments of the present disclosure. All other embodiments, which are obtained by those ordinary skilled in the art based on the embodiments of the present disclosure without creative efforts, shall fall within the scope of the present disclosure.

To save energy, an I2C device is generally set to be in a dormant state under certain conditions, and the I2C device is needed to be woken up for use when it is needed. A method for waking up the I2C device in the dormant state is disclosed.

Figure 1:
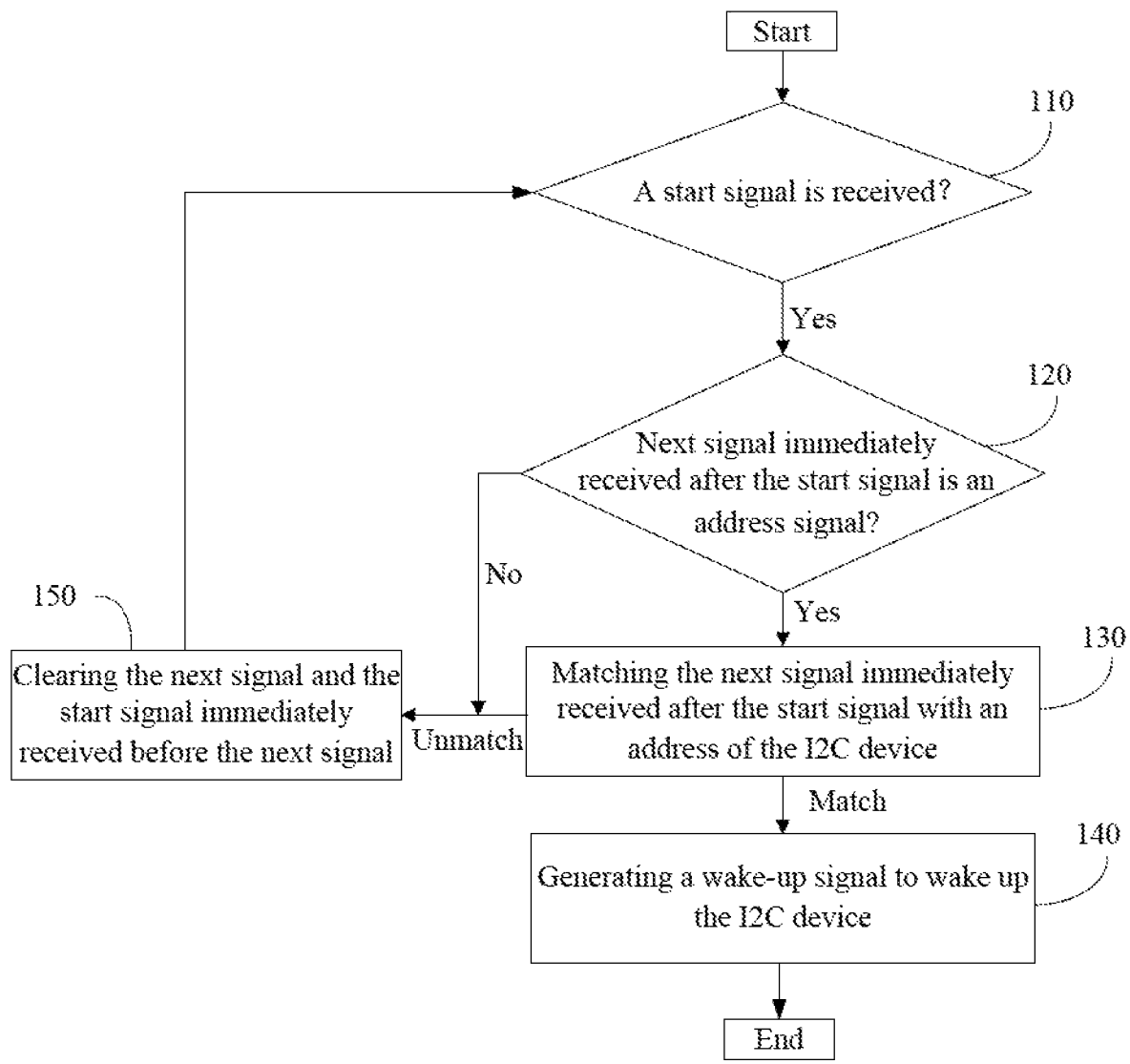
FIG. 1 is a schematic flow diagram of a method for waking up an I2C device according to an embodiment of the present disclosure.

FIG. 1 is a schematic flow diagram of a method for waking up an I2C device according to an embodiment of the present disclosure. The method includes actions/operations in the following blocks.

At block 110, whether a start signal is received is determined.

Specifically, the method receives a signal, and determines whether the signal is the start signal after the signal is received. For the I2C device (i.e. a device on au I2C bus), when a clock signal line (SCL) transmits a high-level signal and a data line (SDA) transmits a signal switched from a high level to a low level, one start signal is generated. That is, when the I2C device receives the high-level signal from SCL and the switch signal from SDA, the I2C device receives one start signal.

When the start signal has been received, block 120 will be performed. The I2C bus connected to the I2C device is decided to be in a busy state, which means it is likely to need to wake up the I2C device, when the start signal has been received. When the I2C device doesn't receive the start signal, the I2C device is still be in the dormant state.

At block 120, whether a next signal immediately received after the start signal is an address signal is determined when the start signal has been received.

An I2C device may have a unique address (which may be obtained from a data book of the I2C device). A master/slave device determines which device to be communicated with based on the address. That is, the address signal may be used for identifying an identity of a device to be woken up so as to accurately wake up the device to be woken up.

When the next signal immediately received after the start signal is the address signal, block 130 is performed And when the next signal immediately received after the start signal isn't the address signal, block 150 is performed. In one example, when the next signal immediately received after the start signal isn't the address signal, the next signal may be another start signal or a stop signal.

At block 130, the method matches the next signal immediately received after the start signal with an address of the I2C device when the next signal is the address signal.

When the next signal immediately received after the start signal is matched with the address of the I2C device, which means that the next signal is a matched address signal for the I2C device, block 140 is performed. When the next signal immediately received after the start signal is not matched with the address of the I2C device, which means that the next signal is a non-matched address signal for the I2C device, block 150 is performed.

At block 140, a wake-up signal is generated to wake up the I2C device.

The wake-up signal is configured to wake up the I2C device. The wake-up signal includes the start signal and the next matched address signal immediately received after the start signal.

When the next signal is the matched address signal for the I2C device, which is configured to determine the I2C device to be woken up and to be constituted together with the start signal immediately received before the next signal, the wake-up signal is generated.

At block 150, the next signal and the start signal immediately received before the next signal are cleared.

As stated above, in a case where the next signal immediately received after the start signal isn't the address signal, block 150 is performed. In this case, after block 150, in order to wake up the I2C device, whether another start signal is received will be determined. That is, the method may be performed again in order to wake up the I2C device.

Similarly, in a case where the next signal is a non-matched address signal for the I2C device, block 150 is performed. In this case, after clearing the next signal and the start signal immediately received before the next signal, in order to wake up the I2C device, whether another start signal is received will be determined. That is, the method may be performed again in order to wake up the I2C device.

In this embodiment, the wake-up signal is generated to wake up the I2C device as long as the next signal immediately received after the start signal is the matched address signal. When the next signal is the non-matched address signal, the next signal and the start signal immediately received before the next signal are cleared so as to have no effect on subsequently-received signals. That is, the wake-up process is not directly ended. Thus, a signal received before the wake-up signal, which is configured to wake up the I2C device and includes the start signal and the next matched address signal, has no negative effect on waking up the I2C device and cannot lead to a problem that the I2C device cannot be normally woken up. Thus, the I2C device can be timely and efficiently woken up when necessary, and the wake-up efficiency can be enhanced.

Figure 2:
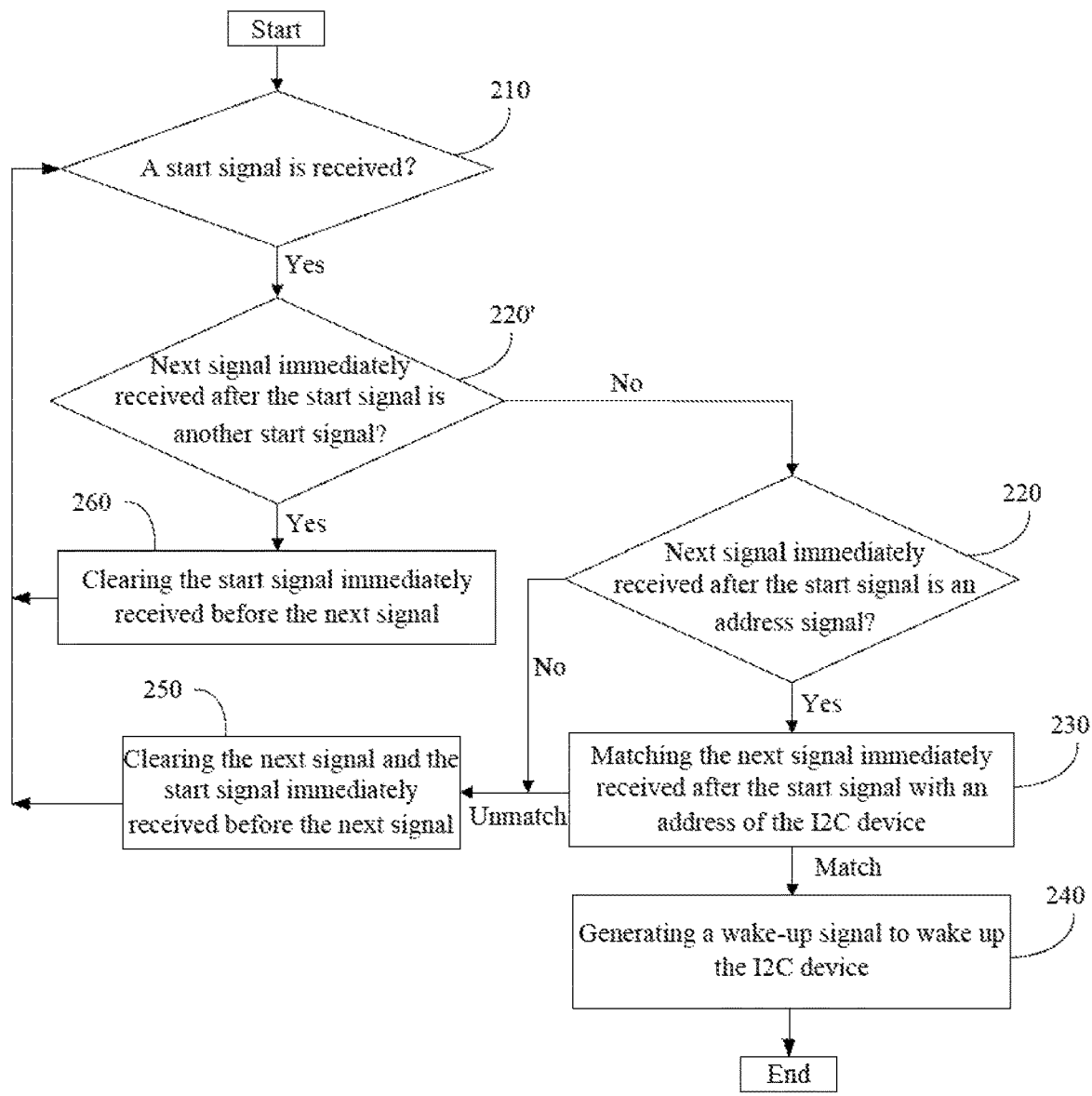
FIG. 2 is a schematic flow diagram of a method for waking up an I2C device according to another embodiment of the present disclosure.

FIG. 2 is a schematic flow diagram of a method for waking up an I2C device according to another embodiment of the present disclosure. The method includes actions, operations in the following blocks.

At block 210, whether a start signal is received is determined.

Specifically, the method receives a signal, and determines whether the signal is the start signal after the signal is received. For the I2C device (i.e. a device on an I2C bus), when a clock signal line (SCL) transmits a high-level signal and a data line (SDA) transmits a signal switched from a high level to a low level, one start signal is generated. That is, when the I2C device receives the high-level signal from SCL and the switch signal from SDA, the I2C device receives one start signal.

When the start signal has been received, block 120 will be performed. The I2C bus connected to the I2C device is decided to be in a busy state, which means it is likely to need to wake up the I2C device, when the start signal has been received.

At block 220', whether a next signal immediately received after the start signal is another start signal is determined when the start signal has been received.

When the next signal immediately received after the start signal is not another start signal, block 220 is performed. When the next signal immediately received after the start signal is the another start signal, which means at least two continuous start signals are received, block 260 is performed.

At block 220, whether a next signal immediately received after the start signal is an address signal is determined when the start signal has been received.

An I2C device may have a unique address (which may lie obtained from a data book of the I2C device). A master/slave device determines which device to be communicated with based on the address. That is, the address signal may be used for identifying an identity of a device to be woken up so as to accurately wake up the device to be woken up.

When the next signal immediately received after the start signal is the address signal, block 230 is performed. When the next signal immediately received after the start signal isn't the address signal, block 250 is performed. In one example, in the case where the next signal immediately received after the start signal isn't the address signal, the next signal immediately received after the start signal is a stop signal. In this example, the I2C bus connected to the I2C device is decided to be in an idle state, and then block 250 is performed. Correspondingly, both the data signal line (SDA) and the clock signal line (SCL) of the I2C bus have a high-level signal. At this time, all output stage field-effect transistors of the I2C device are in an off state. That is, the I2C bus is released. The respective level is pulled up by a respective pull-up resistor of the two signal lines.

At block 230, matching next signal immediately received after the start signal with an address of the I2C device when the next signal is the address signal.

When the next signal immediately received after the start signal is matched with the address of the I2C device, which means that the next signal is a matched address signal for the I2C device, block 240 is performed. When the next signal immediately received after the start signal is not matched with the address of the I2C device, which means that the next signal is a non-matched address signal for the I2C device, block 250 is performed.

At block 240, a wake-up signal is generated to wake up the I2C device.

The wake-up signal is configured to wake up the I2C device. The wake-up signal includes the start signal and the next matched address signal immediately received after the start signal.

When the next signal is the matched address signal for the I2C device, which is configured to determine the I2C device to be woken up and to be constituted together with the start signal immediately received before the next signal, the wake-up signal is generated.

At block 250, the next signal and the start signal immediately received before the next signal are cleared.

As stated above, in a case where the next signal immediately received after tire start signal isn't another start signal and the address signal, block 250 is performed. In this case, after block 250, in order to wake up the I2C device, whether another start signal is received will be determined. That is, the method may be performed again in order to wake up the I2C device.

Similarly, in a case where the next signal is another start signal and a non-matched address signal for the I2C device, block 250 is performed. In this case, after clearing the next signal and the start signal immediately received before the next signal, in order to wake up the I2C device, whether another start signal is received will be determined. That is, the method may be performed again in order to wake up the I2C device.

At block 260, the start signal immediately received before the next signal is cleared.

As stated above, when the next signal immediately received after the start signal is another start signal, block 260 is performed, i.e. the start signal immediately received before the next signal is cleared. In this case, after clearing the start signal immediately received before the next signal, the next signal becomes the currently-received start signal, and then block 210 is performed again without receiving another start signal again since the next signal is the currently-received start signal. That is, the next signal is treated as the currently-received start signal to perform the method again in order to wake up the I2C device. Thus, the I2C device can be timely and efficiently woken up when necessary, and the wake-up efficiency can be further enhanced.

In this embodiment, when at least two continuous start signals are received, the start signals received before the currently received start signal are cleared to save the memory space and further enhance the execution efficiency, such that only one start signal is reserved without receiving the start signal again. Thus, when at least two continuous start signals are received, the I2C device can still be waken up.

Figure 3:
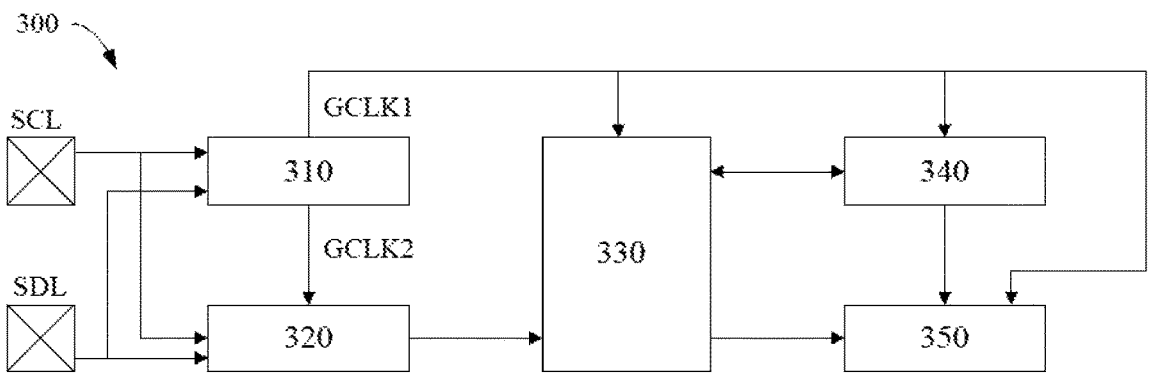
FIG. 3 is a schematic structural diagram of a circuit for waking up an I2C device according to an embodiment of the present disclosure.

FIG. 3 is a schematic structural diagram of a circuit for waking up an I2C device according to an embodiment of the present disclosure. In one example, the circuit 300 may be disposed in the I2C device. In another example, the circuit 300 may be disposed a master device, where the I2C device is treated as a slave device. The circuit 300 includes a clock processing module 310, a start signal detection processing module 320, a state control module 330, an address receiving and comparing module 340, and a wake-up signal processing module 350. The start signal detection processing module 320, the state control module 330, the address receiving and comparing module 340, and the wake-up signal processing module 350 are connected to the clock processing module 310, respectively.

The clock processing module 310 is connected to an I2C bus and configured to receive an I2C clock signal from a serial clock line (SCL) of the I2C bus and an I2C data signal from a serial data line (SDA) of the I2C bus, and generate a corresponding clock signal based on the I2C clock signal and the I2C data signal. The start signal detection processing module 320 is also connected to the I2C bus. The state control module 330 is further connected to the start signal detection processing module 320, the address receiving and comparing module 340, and the wake-up signal processing module 350, respectively.

In one example, the clock processing module 310 is configured to receive an I2C clock signal from a serial clock line (SCL) of the I2C bus and an I2C data signal from a serial data line (SDA) of the I2C bus, and generate a corresponding first clock signal GCLK1 and a second clock signal GCLK2 based on the I2C clock signal and the I2C data signal. The first clock signal GCLK1 is transmitted to the state control module 330, the address receiving and comparing module 340 and the wake-up signal processing module 350, such that the state control module 330, the address receiving and comparing module 340 and the wake-up signal processing module 350 work based on the first clock signal GCLK1. The second clock signal GCLK2 is transmitted to the start signal detection processing module 320, such that the start signal detection processing module 320 works based on the second clock signal GCLK2.

In one embodiment, the start signal detection processing module 320 is configured to receive the I2C clock signal from a serial clock line (SCL) of the I2C bus and the I2C data signal from a serial data line (SDA) of the I2C bus to determine whether a start signal is received from the I2C bus. The state control module 330 is configured to decide a state of the I2C bus based on a result of the determination of the start signal detection processing module 320. The address receiving and comparing module 340 is configured to determine whether a next signal immediately received after the start signal is an address signal and match the next signal with an address of the I2C device when the next signal is the address signal. The wake-up signal processing module 350 is configured to generate a wake-up signal to wake up the I2C device when the next signal is the matched address signal. The start signal detection processing module 320 clears the next signal and the start signal immediately received before the next signal when the next signal is not the address signal or the matched address signal, and continues to detect whether a start signal is received from the I2C bus.

In another embodiment, the start signal detection processing module 320 is configured to receive the I2C clock signal from a serial clock line (SCL) of the I2C bus and the I2C data signal from a serial data line (SDA) of the I2C bus to determine whether a start signal is received from the I2C bus. The state control module 330 is configured to decide a state of the I2C bus based on a result of the determination of the start signal detection processing module 320. The start signal detection processing module 320 is further configured to whether the next signal immediately received after the start signal is another start signal, and clear the start signal immediately received before the next signal when the next signal is another start signal. The address receiving and comparing module 340 is configured to determine whether the next signal immediately received after the start signal is an address signal and match the next signal with an address of the I2C device when the next signal is the address signal. The wake-up signal processing module 350 is configured to generate a wake-up signal to wake up the I2C device when the next signal is the matched address signal. The start signal detection processing module 320 clears the next signal and the start signal immediately received before the next signal when the next signal is nor the address signal or the matched address signal, and continues to detect whether a start signal is received from the I2C bus.

Figure 4:
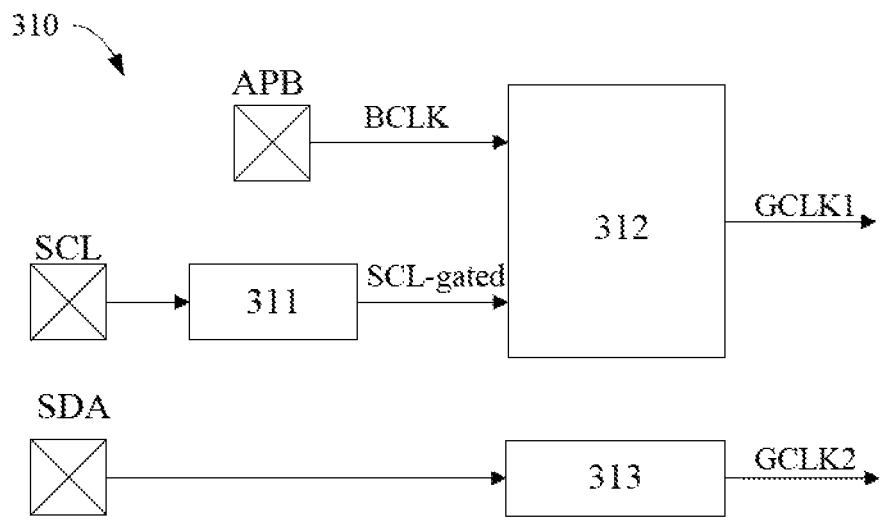
FIG. 4 is a schematic structural diagram of a circuit for waking up an I2C device according to another embodiment of the present disclosure.

FIG. 4 is a schematic structural diagram of a circuit for waking up an I2C device according to another embodiment of the present disclosure. Based on the above embodiment, the clock processing module 310 includes a clock gating unit 311, a clock switching unit 312, and a clock generating unit 313. The clock processing module 310 is connected to the I2C bus. The clock signal line (SCL) of the I2C bus is connected to the clock gating unit 311, and the data signal line (SDA) of the I2C bus is connected to the clock generating unit 313. The clock switching unit 312 is connected to an APB bus and the clock gating unit 311.

The clock gating unit 311 is configured to receive the I2C clock signal from the SCL of the I2C bus to generate a corresponding I2C clock gate signal SCL_gated. The clock switching unit 312 is configured to receive the I2C clock gate signal SCL_gated from the clock gating unit 311 and a bit clock signal BCLK from the APB bus to generate the corresponding first clock signal GCLK1. The clock generating unit 313 is configured to receive the I2C data signal from the SDA of the I2C bus to generate the corresponding second clock signal GCLK2.

Further, when the I2C device is in a dormant state, the bit clock signal BCLK is turned off. When the I2C device is in a non-dormant state, the bit clock signal BCLK is turned over. When the I2C device is in the dormant state, the clock gating unit 311 generates an I2C clock gate signal signal SCL_gated. The clock gating unit 130 is configured to make the SCL communicated with the clock switching unit 312 before the wake-up signal is generated, and make the clock signal line 10 disconnected to the clock switching unit 312 after the wake-up signal is pulled up. The clock switching unit 312 selects the I2C clock gate signal SCL_gated to generate the corresponding first clock signal GCLK1 when the I2C device is in a normal mode, and selects the bit clock signal BCLK to generate the corresponding first clock signal GCLK1 when the I2C device is in a low-power mode.

Figure 5:
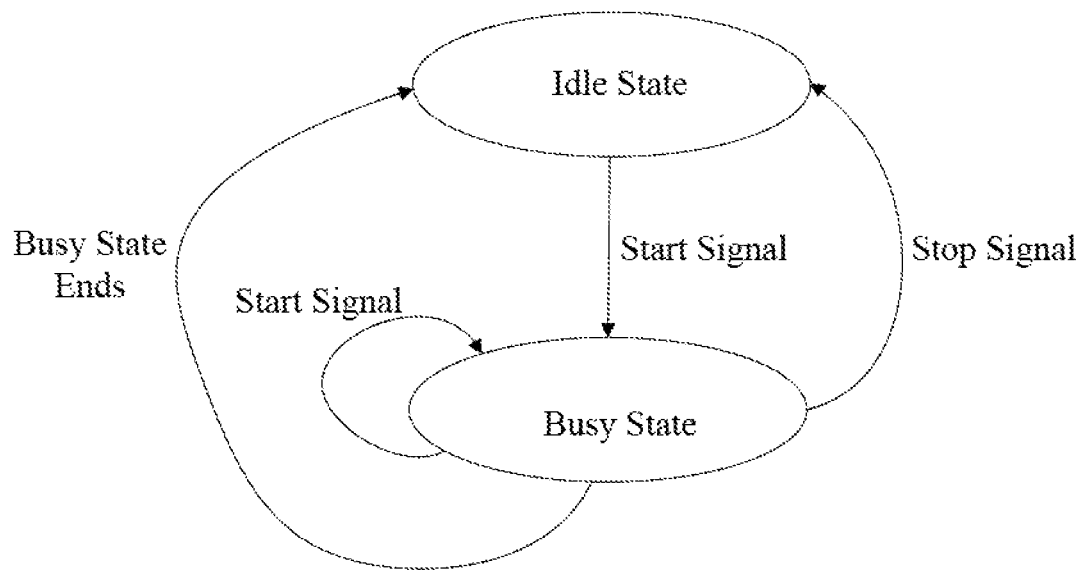
FIG. 5 is a schematic diagram of a state control module according to an embodiment of the present disclosure.

FIG. 5 is a schematic diagram of the state control module 330 according to an embodiment of the present disclosure. The state control module 330 includes an idle state and a busy state. The I2C device is switched be in the busy state when a start signal on a bus is received at any addressing stages, and each related logic is reset to an initial state. Similarly, the I2C device is switched to be in the idle state after a stop signal is received, and each related logic is reset. The whole slave wake-up logical function works under the first clock signal GCLK1 generated by the clock processing module 310. The start signal detection processing module 320 may ensure a correct sequence for start signals/stop signals in a case where there are a plurality of start signals, there are a plurality of stop signals or buses are in abnormal operation, and may ensure no incorrect state switch and ensure proper functioning of other logic blocks. In this embodiment, it is not needed to use a high frequency clock when the I2C device is in the dormant state, and thus the energy consumption is low. Furthermore, a clock signal line and a data signal line of the I2C device are employed to generate a clock signal that can be normally used when the I2C device is in the dormant state, making it convenient to timely wake up the I2C device.

The technical solution of the present disclosure may be used for any process for waking up the I2C device. For example, devices using I2C protocol in the field of smart home in the locomotive field. Particularly in the locomotive field, for an audio and video entertainment part, a system-level chip and of a hotspot is generally needed to communicate with a microchip. The system-level chip with an I2C bus is used as a slave device, and the microchip with the I2C bus is used as a master device. Generally, the system-level chip is in a dormant state so as to reduce power consumption of the whole locomotive. In such a case, the system-level chip may be woken up by the microchip. Therefore, technical solution of the present disclosure may sufficiently reduce the power consumption, and may ensure the system-level chip to be timely woken up.

As stated above, a method and a circuit for waking up an I2C device are disclosed. The method includes: determining whether a start signal is received; determining whether a next signal immediately received after the start signal is an address signal when the start signal is received; matching the next signal immediately received after the start signal with an address of the I2C device when the next signal is the address signal; and generating a wake-up signal to wake up the I2C device when the next signal is the matched address signal, and clearing the next signal and the start signal immediately received before the next signal when the next signal is not the matched address signal. The method and the circuit for waking up an I2C device provided by the present disclosure can increase efficiency in waking up the I2C device, and ensure the I2C device to be woken up in time and normally used.

The above are merely embodiments of the present disclosure and are not intended to limit the patent scope of the present disclosure. Any modifications of equivalent structure or equivalent process made on the basis of the contents of the description and accompanying drawings of the present disclosure or directly or indirectly applied to other related technical fields shall similarly fall within the scope of patent protection of the present disclosure.

What is claimed is:

1. A method for waking up an I2C device, comprising:
determining that a start signal is received;
determining that a next signal immediately received after the start signal is another start signal;
clearing the start signal immediately received before the next signal and reserving the another start signal to reperform determinations when the next signal immediately received after the start signal is the another start signal;
determining that the next signal immediately received after the start signal is an address signal when the next signal immediately received after the start signal is not the another start signal;
matching the next signal immediately received after the start signal with an address of the I2C device when the next signal is the address signal; and
generating a wake-up signal to wake up the I2C device when the next signal immediately received after the start signal is matched with the address of the I2C device.

2. The method of claim 1, further comprising:
clearing the next signal and the start signal immediately received before the next signal to reperform the determinations when the next signal is not the address signal.

3. The method of claim 1, further comprising:
clearing the next signal and the start signal immediately received before the next signal to reperform the determinations when the next signal immediately received after the start signal is not matched with the address of the I2C device.

4. The method of claim 1, wherein an I2C bus connected to the I2C device is in a busy state when the start signal is received.

5. The method of claim 1, wherein the start signal is generated when an I2C clock signal is high-level and an I2C data signal is switched from a high level to low level.

6. A circuit for waking up an I2C device, comprising:
a start signal detection processing module connected to an I2C bus, configured to determine that a start signal is received from the I2C bus, wherein the start signal detection processing module is further configured to determine that a next signal immediately received after the start signal is another start signal, and clear the start signal immediately received before the next signal and reserve the another start signal to reperform determinations when the next signal immediately received after the start signal is the another start signal;
an address receiving and comparing module, configured to determine that the next signal immediately received after the start signal is an address signal when the next signal immediately received after the start signal is not the another start signal, and match the next signal with an address of the I2C device when the next signal is the address signal; and
a wake-up signal processing module connected to the address receiving and comparing module, configured to generate a wake-up signal to wake up the I2C device when the next signal is the matched address signal.

7. The circuit of claim 6, wherein the start signal detection processing module is further configured to clear the next signal and the start signal immediately received before the next signal to reperform the determinations when the next signal immediately received after the start signal is not matched with the address of the I2C device or when the next signal is not the address signal.

8. The circuit of claim 6, further comprising:
a state control module connected to the start signal detection processing module, configured to decide the I2C bus is in a busy state when the start signal is received.

9. The circuit of claim 8, further comprising:
a clock processing module connected to the state control module, the address receiving and comparing module and the wake-up signal processing module, respectively, configured to receive an I2C clock signal and an I2C data signal from the I2C bus and generate a corresponding clock signal based on the I2C clock signal and the I2C data signal.

10. The circuit of claim 9, wherein the clock signal comprises a first clock signal and a second clock signal; the start signal detection processing module is configured to receive the second clock signal to work; and the state control module, the address receiving and comparing module and the wake-up signal processing module are configured to respectively receive the first clock signal to work.

11. The circuit of claim 10, wherein the clock processing module comprises:
a clock gating unit, configured to receive the I2C clock signal from the I2C bus to generate a corresponding I2C clock gate signal;
a clock switching unit, configured to receive the I2C clock gate signal and a bit clock signal to generate the first clock signal; and
a clock generating unit, configured to receive the I2C data signal from the I2C bus to generate the second clock signal.

12. The circuit of claim 6, wherein the start signal is generated when the I2C clock signal is high-level and the I2C data signal is switched from a high level to a low level.

13. The circuit of claim 6, wherein the circuit is disposed in the I2C device.

* * * * *